Figure 1:
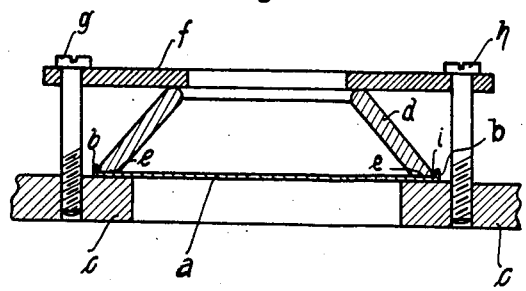

March 22, 1927.  1,621,670
F. JOKEL
SOUND BOX DIAPHRAGM FOR USE IN TELEPHONES, LOUD SPEAKERS,
ACOUSTIC APPARATUS, AND THE LIKE
Filed Oct. 1, 1924

Inventor
Franz Jokel
By B. Singer Atty.

Patented Mar. 22, 1927.

1,621,670

UNITED STATES PATENT OFFICE.

FRANZ JOKEL, OF BERLIN, GERMANY, ASSIGNOR TO CARL LINDSTRÖM AKTIENGE-SELLSCHAFT, OF BERLIN, GERMANY.

SOUND-BOX DIAPHRAGM FOR USE IN TELEPHONES, LOUD SPEAKERS, ACOUSTIC APPARATUS, AND THE LIKE.

Application filed October 1, 1924, Serial No. 741,021, and in Germany May 1, 1924.

This invention relates to sound box diaphragms for use in telephones, loud speakers, acoustic apparatus and the like, and has particular reference to arrangements for tensioning the diaphragm in such apparatus.

It is well known to stretch sound box diaphragms radially, particularly those to be used for telephones and loud speakers, so that as thin a material as possible may be used for the diaphragm in order to reduce the mass inertia. It has previously been proposed to stretch diaphragms of this kind by pressing them through a ring into an annular groove of angular shape in cross section. The disadvantages of this arrangement are however the disturbing effect on the condition of the material that is produced and the unequal strain put upon the upper and under sides of the diaphragm in the inner zone intended for the transmission of the sound, with the result that the diaphragm becomes unevenly stretched.

The present invention has for its object to avoid the disadvantages above referred to, and for this purpose there is employed in accordance with the invention a device in which the diaphragm is stretched by means of an elastic pressure ring having the form of a hollow truncated cone pressed against the said diaphragm so that the diaphragm is held flat over the whole of its surface by the radial pressure of the said ring. For subjecting the elastic pressure ring to the desired pressure so as to press it against the diaphragm there may be employed a thrust plate provided with means such as screws or the like for adjusting its pressure. When the diaphragm is to be stretched under very high tensions the arrangement may be such that the pressure ring is stretched by means of a stretching ring of wedge-shaped cross section which engages with the inner surface of the said pressure ring, the said stretching ring being subjected either to the pressure of a thrust plate, provided with screws or the like for adjusting its pressure, or to the pressure of adjusting screws alone acting directly against the stretching ring.

The diaphragm may be provided at its edge with a flange, a turned up edge or the like which acts as an abutment for the hollow truncated cone shaped ring.

In order to prevent the flanged edge of the diaphragm from being bent up an abutment made of some elastic material may be provided at the outer periphery of the flange.

The hollow truncated cone shaped ring itself may be wholly or partially split so as to produce particularly in the case of very large diaphragms, an increased tensioning effect, or the said ring may consist of several parts.

In order that the said invention may be clearly understood and readily carried into effect, the same will now be described more fully with reference to the examples illustrated in the accompanying drawings, in which:—

Figure 2:
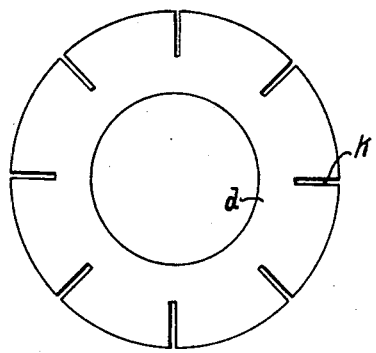
Figure 3:
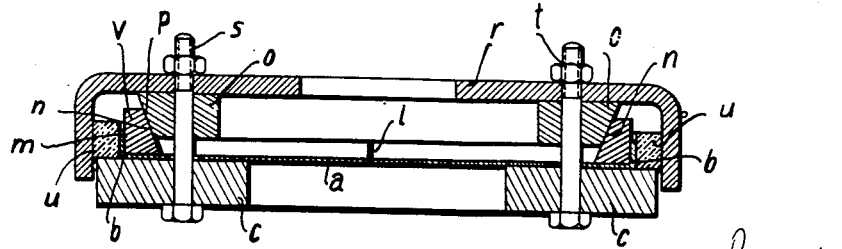

Figure 1 is a cross section of one arrangement in accordance with the present invention, Figure 2 is a plan view of the pressure ring of a modified form of construction, and Figure 3 is a vertical section of a further constructional form.

In the construction shown in Figure 1 the diaphragm $a$ which is preferably made of sheet iron is provided with a flanged edge $b$ and is mounted in the well known way on the base or foundation plate $c$. The lower and wider edge $e$ of the thrust or pressure ring $d$, which is made in the form of a hollow truncated cone, is mounted on the other side of the diaphragm. On the upper supporting part of the pressure ring $d$ is laid a thrust plate $f$ which, by means of the screws $g$ and $h$, which engage in the base or foundation plate $c$, can be adjusted or clamped fast. By adjusting the screws $g$ and $h$ the thrust plate $f$ is pressed against the pressure ring $d$ and presses this ring, which owing to its shape is elastic, down on to the diaphragm $a$, so that this latter is stretched by the pressure of the edge $e$ of the ring $d$ acting in a radial direction. Under a suitably high pressure the edge $e$ of the ring $d$ will bear against the flanged edge $b$ of the diaphragm and produce a further stretching thereof. By suitable adjustment of the screws $g$ and $h$ it is possible to adjust the pressure of the ring and consequently the stretching of the diaphragm to any desired degree.

In the case of large diaphragms the pressure ring may also be provided with one or more radial slits $k$ as shown in Figure 2, which slits are provided at a suitable distance from the lower bearing surface of the ring. A ring in the form of a hollow frustum of a cone composed of a number of parts combined together may also be used.

The constructional form shown in Figure 3 is specially suitable for arrangements for the production of very highly stretched diaphragms, and differs from the constructional forms above described by the fact that the elastic pressure ring is pressed against the diaphragm to be stretched by means of a stretching ring of wedge-shaped cross section which engages with the inner surface of the pressure ring.

In this constructional form which is shown by way of example in Figure 3, the diaphragm is also provided (as in the constructional form shown in Figure 1) with a flanged edge *b* and is mounted in the well known way on a base or foundation plate *c*. The pressure ring *v* may be wholly or partially slit at 1 or some other suitable point in order to give it the required elasticity, and bears with its outer periphery *m* against the inner periphery of the flange *b*. On its inner side of the pressure ring *v* may be conveniently bevelled off as at *n* and with this bevel the wedge-shaped outer surface *p* of the stretching ring *o* coacts.

As shown in Figure 3 the stretching ring *o* may be mounted on a cover plate *r* constructed in the form of a thrust plate. The adjustment or shifting of the stretching ring *o* and the thrust plate *r* is effected by means of the screws *s*, *t* or the like of which a suitable number are provided and which are carried in the base or foundation plate *c*. The thrust and pressure plate *r* might be dispensed with entirely when adjusting screws acting directly against the stretching ring *o* are provided. The stretching ring may also be replaced by separate stretching pieces. On the outer periphery of the flange *b* of the diaphragm there is provided an abutment *u* consisting of some elastic material, for example fibre or the like, which on its other side bears against the cover plate *r* so that even when the flange *b* is subjected to severe strain it will be prevented from bending up without the radial expansion of the diaphragm when stretched being interferred with. Such an arrangement of elastic abutment may also be provided in the constructional form shown in Figure 1.

Having now fully described my invention what I claim and desire to protect by Letters Patent of the United States of America is:

1. In a sound box the combination of a base having an opening, a diaphragm on the base and covering the opening and provided with a peripheral flange, an elastic pressure ring on the diaphragm and bearing against the flange thereof and means exerting pressure on said ring to cause it to expand radially and thereby exert corresponding pressure on the diaphragm and hold the same flat.

2. In a sound box the combination of a base having an opening, a diaphragm on the base and covering the opening and provided with a peripheral flange, an elastic pressure ring on the diaphragm and bearing against the flange thereof and means exerting pressure on said ring to cause it to expand radially and thereby exert corresponding pressure on the diaphragm and hold the same flat, said means including a thrust plate and screws connecting the thrust plate to the base, said thrust plate having an opening substantially concentric with that of the base.

3. In a sound box the combination of a base having an opening, a diaphragm on said base covering said opening and having a peripheral flange, an elastic pressure ring on said diaphragm engaging said flange and having an inclined downwardly converging surface, a stretching ring in said pressure ring and having a downwardly converging outer surface and means exerting pressure on said stretching ring to cause the same to radially expand the pressure ring and thereby hold the diaphragm flat.

4. In a sound box the combination of a base having an opening, a daphragm on said base covering said opening and having a peripheral flange, an elastic pressure ring on said diaphragm engaging said flange and having an inclined downwardly converging surface, a stretching ring in said pressure ring and having a downwardly converging outer surface and means exerting pressure on said stretching ring to cause the same to radially expand the pressure ring and thereby hold the diaphragm flat, said means comprising a thrust plate bearing on the stretching ring and screws connecting said thrust plate to the base.

5. In a sound box the combination of a base having an opening, a diaphragm on said base covering said opening and having a peripheral flange, an elastic pressure ring on said diaphragm engaging said flange and having an inclined downwardly converging surface, a stretching ring in said pressure ring and having a downwardly converging outer surface and means exerting pressure on said stretching ring to cause the same to radially expand the pressure ring and thereby hold the diaphragm flat, said means comprising a thrust plate bearing on the stretching ring and screws connecting said thrust plate to the base, said thrust plate having a downwardly turned flange, and an abutment element of elastic material arranged between the flange of the diaphragm and the flange of the thrust plate.

In testimony whereof, I affix my signature.

FRANZ JOKEL.